March 12, 1968  E. M. JAMISON  3,372,449
AUTOMATIC FEED FOR MULTIPLE SPINDLE BAR MACHINES
Filed June 15, 1966  2 Sheets-Sheet 1

INVENTOR
EUGENE M. JAMISON

BY *Cullen, Sloman, & Cantor*

ATTORNEYS

March 12, 1968  E. M. JAMISON  3,372,449
AUTOMATIC FEED FOR MULTIPLE SPINDLE BAR MACHINES
Filed June 15, 1966  2 Sheets-Sheet 2
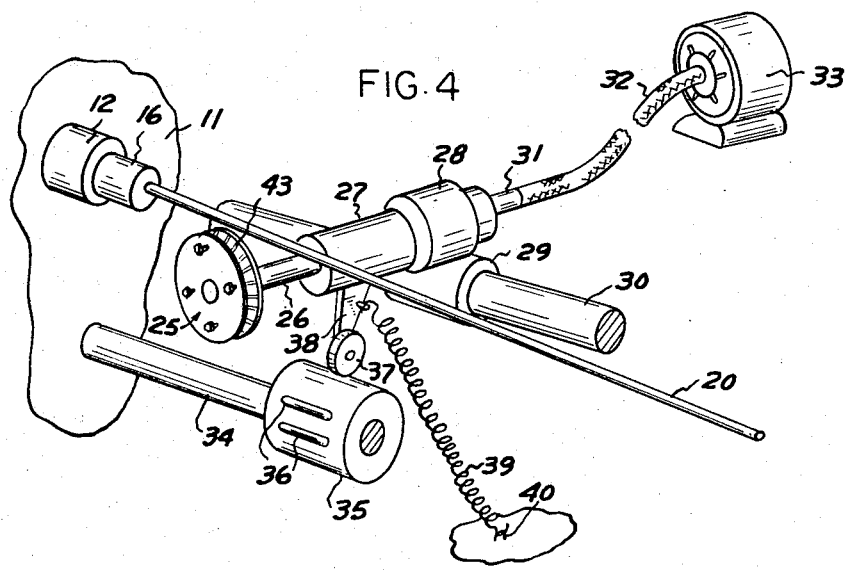
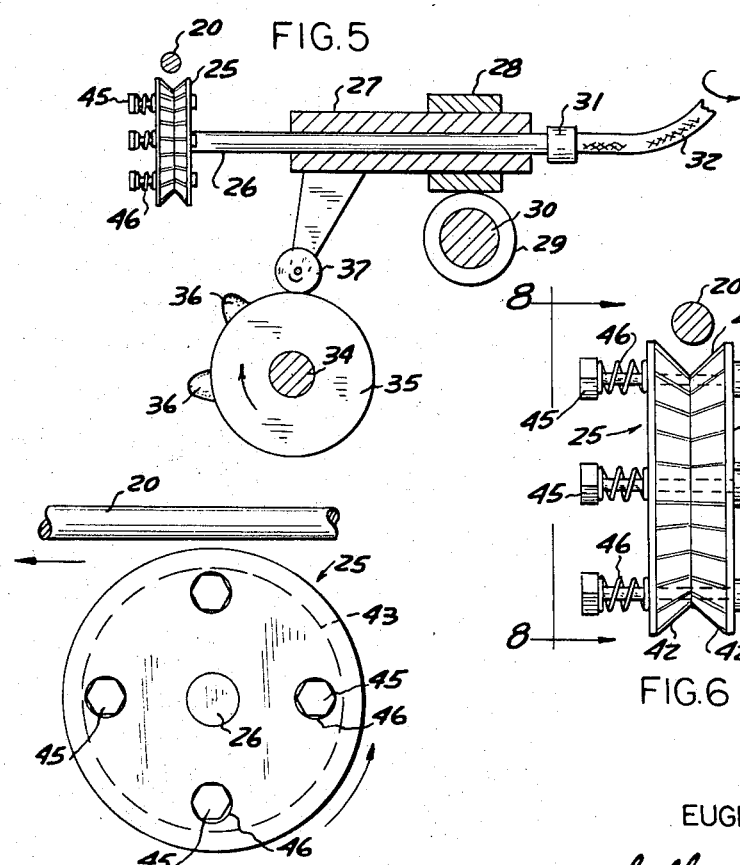
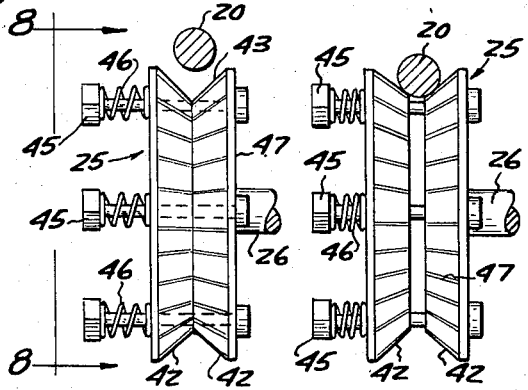
INVENTOR
EUGENE M. JAMISON
ATTORNEYS United States Patent Office 3,372,449
Patented Mar. 12, 1968

3,372,449
AUTOMATIC FEED FOR MULTIPLE SPINDLE BAR MACHINES
Eugene M. Jamison, 5669 Harvey, Detroit, Mich. 48209
Filed June 15, 1966, Ser. No. 557,712
1 Claim. (Cl. 29—37)

ABSTRACT OF THE DISCLOSURE

An automatic bar feed, for a multiple spindle bar machine, having a constantly rotating, vertically movable feed roller located beneath and in the plane of the bar to be fed and means for momentarily elevating the roller into contact with the bar for axially driving it in timed relationship to the release of the bar from its gripping collet; said means including a shaft having one end connected to the roller and its opposite end connected through a flexible coupling to a drive motor, with the shaft extending through a sleeve pivotally mounted upon a support shaft of the machine and rocked vertically upwardly by a timing cam, for thereby rocking the sleeve vertically upwardly and momentarily contacting the roller to the bar.

---

This invention relates to an automatic feed for a multiple spindle bar machine.

In a multiple spindle bar machine, workpieces, in the form of long rods or bars, are held within rotating, hollow spindles, which spindles are mounted so as to move the workpieces through a series of work stations. At each work station, various cutting and drilling tools operate upon the workpiece for a predetermined period of time, after which the spindle mount is cycled to move all the spindles at one time so as to advance their workpieces to the next work station. One work station normally functions as a load and unload position where the workpiece is loosened within its spindle and the completed workpiece is released, while the remaining portion of the bar is advanced and then locked within the spindle for processing through the various work stations.

Normally, the bars are held within the spindles by a suitable collet or chuck-type device which is loosened and again tightened at the load and unload station. In order to advance the bar, such machines usually include a pusher mechanism which grips the bar and advances it during the time that the collect is opened. Such pusher mechanisms are relatively complex, require constant maintenance, and considerable labor to operate. Particularly, when a particular bar is used up, that is, the entire bar has been fed through the spindle, normally manual chucking and locking is required to remove the butt end of the bar and replace a new or fresh bar for processing. Such chucking requires a considerable amount of manual strength as well as some considerable time so that on such type machines, it was necessary for the operators to be persons of considerable physical strength and in addition, requires a relatively large time loss at the frequent times that bars are replaced.

Hence, it is an object of this invention to provide an automatic feed mechanism for a multiple spindle bar machine which eliminates all of the complex pusher mechanisms and the required chucking and unchucking of the bar for replacement of bars and eliminates almost completely the time lag in replacing bars as well as eliminating the need for physical strength required in chucking.

A further object of this invention is to provide an extremely simplified automatic feed mechanism which is of extremely low cost and is easily serviced and maintained and which requires almost no operator attention nor operator activity for automatic feed of the bars when required.

These and other objects and advantages of this invention will become apparent upon reading the following description, of which the attached drawings form a part.

In these drawings:

FIG. 4 is a fragmentary, perspective view of the feed mechanism herein, and

FIG. 5 is an elevational view, partially in cross-section, of the feed mechanism.

FIG. 6 is an end view of the feed roller, before engaging the bar, and

FIG. 7 is a view similar to FIG. 6 but showing the roller in engagement with the bar for feeding.

FIG. 8 is a front elevational view of the roller spaced beneath the bar to be fed.

Figure 1:
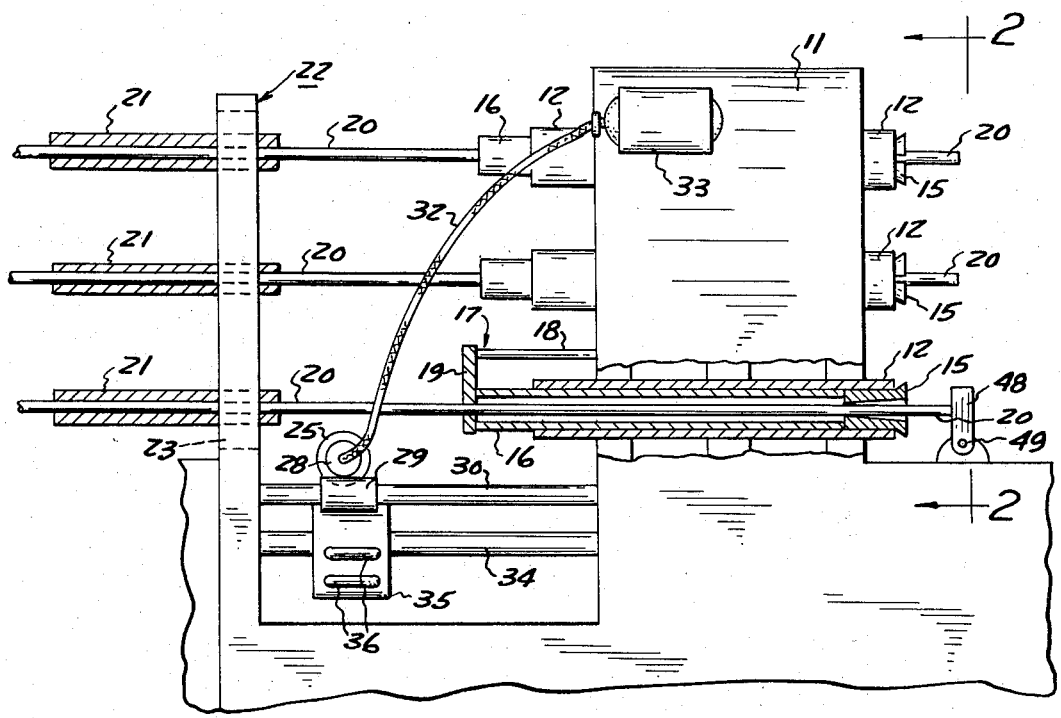
FIG. 1 is a schematic elevational view, partly in cross-section of the head-stock portion of a multiple spindle bar machine.
Figure 2:
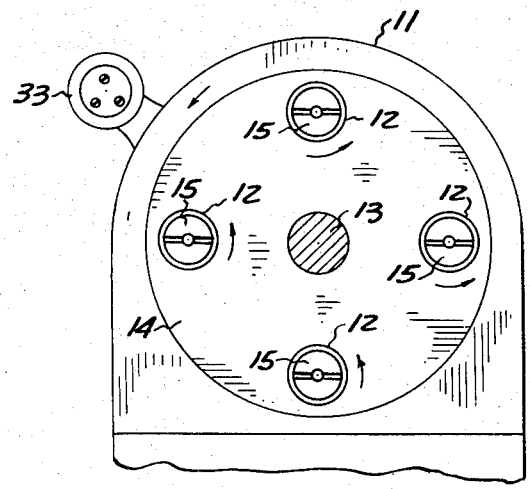
FIG. 2 is an end view of the spindles and spindle carrier and is taken as if in the direction of arrows 2—2 of FIG. 1.

Referring to FIGS. 1 and 2 of the drawings, a typical multiple spindle bar machine 10 includes a head stock 11 through which extend a number of hollow drive spindles 12. The number of spindles may vary in any one particular machine, such as four, six or eight or the like spindles, depending upon how many work stations are desired. Within the head stock are drive mechanisms, including gears and the like driven by a central drive shaft 13, which causes all spindles to rotate in the same direction. The drive mechanism being not part of the invention herein, is omitted for clarity purposes.

The spindles are all mounted within a spindle carrier 14 which is rotatably mounted and driven by a mechanism formed within the headstock for rotating the spindles or indexing the spindles, step by step so that each spindle passes through each work station and remains at that work station for a predetermined period of time. One of the work stations, for example, the lowest one, may function as the load and unload station in a manner to be described below:

The end of each spindle receives a split type of collet 15 which is secured to a collet shaft located within the spindle and extending out the rear end of the spindle, where it is connected to a suitable push-pull mechanism for moving the collet outwardly of the spindle to thereby release the collet pressure upon a bar held within the collet. The push-pull mechanism is schematically shown as including a slidable drive shaft connected by means of a bracket 19 to the end of a collet shaft. Actually, the mechanism used is considerably more complex, but for purposes of description herein, the schematic showing above will suffice.

The workpiece bars 20 are in the form of long rods or bars, such as ten or more feet in length which pass freely through the collet shaft 15 and the spindle 12 so that its end is gripped by the split collet 15 and thereby locked within the spindle for rotation with the spindle. The bars' rear ends are normally supported within journal tubes 21 which are held upon end support 22 by means of a large gear or drum 23 which rotates at the same time as does the spindle carrier for indexing the workpieces.

The operation of such machine in general, consists of first loading all the spindles with bars 20 so that the bars extend out of the ends of the collets. The spindles rotate each of the bars at each work station where there are located suitable cutting tools, grinding tools, drills and the like so that each work station performs one or more operations upon the workpiece. At the completion of the operation at any one work station, all the spindles are indexed one work station so that they advance one by one through a complete cycle. As mentioned above, the lower stage is the load and unload position where the finished end of the bar, now a separate workpiece may be removed and the bar advanced for recycling through the stages. The above construction is all conventional and forms no part of the invention herein.

Figure 3:
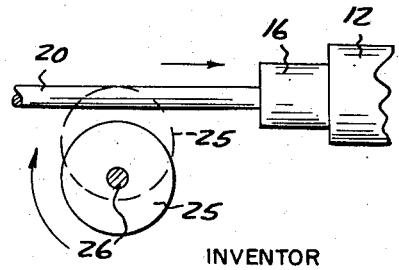
FIG. 3 is a schematic view of the automatic feed roller portion.

This invention is concerned with the feed mechanism for advancing the bar at the load-unload station and, referring to FIG. 3, includes a constantly rotating drive roller 25 mounted upon a drive roller shaft 26, which roller is normally out of contact with the bar but which may be momentarily placed into contact with the bar to exert a longitudinal force upon the bar for advancing it through the spindle at the time the collet is opened.

Referring to FIGS. 4 and 5, the shaft 26 is journaled through a long sleeve 27 which is surrounded by a fixed collar 28 rigidly connected to a bushing 29 which is rotatably fitted over the chucking shaft 30 of the machine. The shaft 26 is coupled at 31 to a conventional flexible drive shaft 32 whose opposite end is connected to a constantly rotating drive motor 33.

Located beneath the shaft 26 is a cam drive shaft 34 upon which a cam drum 35 is mounted with the drum having cam lobes 36 arranged to contact a cam roller 37 connected by a bracket 38 to the sleeves 27. The bracket is connected by a suitable spring 39 to a portion of the machine at 40 so that normally the sleeve is biased downwardly, as shown in the drawings, to keep the roller 25 out of contact with the bar 20. However, when the lobes 36 engage the cam roller 37, the sleeve 27 is forced upwardly and pivots with the bushing 29 around shaft 30 to thereby elevate the roller 25 into contact with the bar 20 for driving or feeding the bar. At all times, the roller 25 rotates at a constant speed.

The roller 25 is preferably formed of two roller halves 42 (see FIGS. 6 and 7) each having a chamfered edge which together form a V-shaped groove 43 for receiving the bar 20. The two halves are normally arranged in face to face contact, with one half being permanently secured to the shaft 26 and the other being movable relative to the shaft and with the two being secured together by means of long bolts 45 upon which are carried springs 46 so that the halves may separate only against the force of the compression springs.

As shown in FIG. 6, the two halves are in face to face contact at the time the roller is rotating out of contact with the workpiece, but these two halves tend to separate (see FIG. 7) when they contact the bar 20, thereby exerting a substantial frictional force against the bar for driving it.

The groove formed by the two halves may have a serrated or channeled surface 47 to thereby increase the frictional engagement with the workpiece.

The operation of the feed mechanism is as follows: At the lowest work station, the push-pull collect release mechanism 17 moves the collet shaft to the right (see FIG. 1) to thereby loosen the grip of the collet against the bar since the collet, being springy, springs apart upon being moved outwardly of the spindle 12. At that point the bar is released and simultaneously one of the cam lobes 36 engages the roller 37 to thereby pivot the sleeve 27 upwardly causing the constantly rotating roller 25 to engage the bar 20 and move it towards the right. That movement forces outwardly the end workpiece which has been severed off the bar at a previous work station or may be severed from the bar at that station.

The roller then drops out of contact with the bar momentarily during which time an automatic stop 48, pivotally connected at 49 to the machine, is automatically moved into the path of the bar. Such automatic stops are commonly provided on this type of machine and no further description is needed since they are conventional.

At this point, the second lobe 36 of the cam 35 engages the roller 37 to again momentarily place the roller 25 into contact with the bar and this moves the bar into contact with the stop 48. At this point, engagement between roller 25 and the workpiece continues to provide a longitudinal force upon the workpiece while the push-pull mechanism 17 moves the collet 15 back into the spindle 12 to thereby grip the workpiece. By maintaining the force of the roller, the workpiece or bar is prevented from being moved by the movement of the collet rearwardly away from the stop so that the workpiece is now properly positioned. One of the disadvantages of the prior types of feed mechanisms is that they did not exert sufficient force upon the bar to prevent the bars from sliding back with the collet a short distance, thereby requiring compensation for improper location of the bar. With this mechanism, the roller keeps the bar outward even though the collet tends to pull it in inwardly of the spindle, to thereby maintain the precise position of the bar until such time as the collet actually locks the bar in position.

Next, the second lobe 36 disengages with the roller 37 and the roller 25, due to the spring 39 is pulled downwardly away from the bar.

The above cycle is repeated each time a spindle reaches the lower load-unload position.

When the bar is used up, the operator of the machine pushes another bar through the journal tube 21 and into the end of the spindle 12 and then that new bar is advanced by the roller in the load-unload position to force out the butt end of the used up bar while at the same time arranging it for proper positioning within the collet. This replacement of bars is done simply and automatically and without the need for the previous conventional manual chucking and unchucking, etc.

This invention may be further developed within the scope of the following claim. Accordingly, it is desired that the foregoing description be read as being merely illustrative of an operative embodiment of this invention, and not in a strictly limited sense.

Having fully described an operative embodiment of this invention, I now claim:

1. In a spindle bar machine having a horizontally axised, hollow, rotatable spindle with a front end upon which is mounted a collet means for gripping an end of an elongated bar type workpiece which freely passes through the spindle and normally extends out of the rear end thereof and said machine having support means located rearwardly and remotely from the spindle, for normally supporting the opposite free end of the bar, with at least one horizontal shaft passing from beneath the spindle, parallel to the bar, to said support means, and said machine having means for momentarily opening and closing the collet means for releasing the bar for forward feed of the bar, the improvement comprising:

an automatic bar feed formed of a bushing rotatably mounted upon said shaft and a normally horizontally arranged sleeve secured to the bushing and extending perpendicularly towards, but beneath the bar;

a rotatable drive shaft extending through the sleeve with a drive roller mounted upon one end of the shaft normally spaced a short distance beneath, but in the vertical plane of the bar, the opposite end of the shaft being connected through a flexible drive cable to a constantly running drive motor for continuous rotation of the roller;

a cam follower secured to and extending downwardly from the sleeve near the roller;

a horizontal, machine-driven rotating cam located beneath the follower and having cam lobes for cyclically engaging the follower to thereby raise it and the sleeve upwardly so that the sleeve with its bushing rocks vertically upwardly upon the bushing carrying shaft in response to the cam, and spring means connecting the sleeve to a portion of the machine located beneath the sleeve for rocking the sleeve downwardly; said roller being vertically elevated into momentary peripheral contact with the bar when the sleeve is rocked upwardly for momentarily applying an axially directed moving force upon the bar, with the cam being timed to raise the sleeve when said spindle collet means is released for thereby automatically feeding the bar forwardly through the spindle.

References Cited

UNITED STATES PATENTS

| 3,203,608 | 8/1965 | Mogolis | 226—155 |
| 1,320,609 | 11/1919 | Drissner | 29—37 |

RICHARD H. EANES, JR., *Primary Examiner.*